United States Patent [19]
Yamamoto

[11] Patent Number: 6,041,421
[45] Date of Patent: Mar. 21, 2000

[54] STORAGE APPARATUS SYSTEM

[75] Inventor: Akira Yamamoto, Sagamihara, Japan

[73] Assignee: Hitachi, Ltd., Tokyo, Japan

[21] Appl. No.: 09/041,785

[22] Filed: Mar. 13, 1998

[30]     Foreign Application Priority Data

Mar. 14, 1997   [JP]   Japan ................................. 9-060506

[51] Int. Cl.[7] ................................................. G06F 11/00
[52] U.S. Cl. ............................................. 714/7; 714/710
[58] Field of Search ................................... 714/7, 8, 710, 714/711; 370/216, 228, 227

[56]              References Cited

U.S. PATENT DOCUMENTS

| | | | |
|---|---|---|---|
| 4,667,326 | 5/1987 | Young ..................................... | 714/761 |
| 4,722,085 | 1/1988 | Flora et al. ............................. | 714/761 |
| 4,761,785 | 8/1988 | Clark ...................................... | 714/761 |
| 4,914,656 | 4/1990 | Dumphy, Jr. et al. .................. | 714/710 |
| 5,926,341 | 7/1999 | Mueller et al. .......................... | 360/92 |

OTHER PUBLICATIONS

D.A. Patterson, et al. "ACM Sigmod conference proceeding", Jun. 1988.
A.E. Bell of IBM "DVD Applications", Nov. 1996.
David A. Patterson et al. A case for redundant Arrays of Inexpensive Disks (RAID), Dec. 1987.

*Primary Examiner*—Dieu-Minh T. Le
*Assistant Examiner*—Pierre Eddy Elisca
*Attorney, Agent, or Firm*—Antonelli, Terry, Stout & Kraus, LLP

[57]              ABSTRACT

In order to make maintenance work of a storage apparatus system having redundant data easy, it is desirable to set a storage medium group sharing common redundant data at locations that can be easily identified. The system provides a storage apparatus system having transportable recording media. In the system when a failure occurs in a storage medium the data of the failed storage medium is recovered and then stored on a spare storage medium. The spare storage medium having the recovered data is then moved, by a robot, to a location that is closely related to a storage medium group sharing common redundant data with the failed storage medium.

30 Claims, 10 Drawing Sheets

A PLURALITY OF (m+n) UNITS (m+n) PIECES

STORAGE APPARATUS SYSTEM

BACKGROUND OF THE INVENTION

The present invention relates in general to a storage apparatus system. More particularly the present invention relates to a storage apparatus system which has redundancy in each configuration element thereof for increasing the availability of the storage apparatus system.

Storage systems using redundant disk arrays are well known as evidenced by "A Case for Redundant Arrays of Inexpensive Disk (RAID)", by D. A. Patterson, et al. ACM SIGMOD conference proceeding, Chicago, Ill., Jun. 1, 1988, pp. 109 to 116 (Document 1).

A disk array is a disk system for increasing the performance and the reliability of the disk system. In a disk array, a plurality of physical disk drives are arranged so that the physical disk drives appear to an information processing unit as a single logical disk drive in order to enhance the performance. In order to improve reliability, redundant data is stored in a separate disk drive so that data existing prior to the occurrence of a failure can be recovered.

In general, units in which data is read and written from and to a disk drive is called a record. Document 1 proposes some techniques for arranging records. When a disk array is used, however, a record seen from an information processing unit as a read/write unit have a data length different from that of a record actually stored in a disk drive. Hereafter, the former and the latter are referred to as a logical record and a physical record respectively. The following is description of some techniques of arranging records which are proposed in Document 1.

According to a first technique of arranging records, a logical record, that is, a record seen from the processing apparatus side, is stored in a disk drive by dividing the logical record into m physical records where $m \geq 1$. This technique is referred to hereafter as a division arrangement technique. By adopting the division arrangement technique, one logical record can be stored in m units of disk drives. Thus, the data transfer speed appears to the information processing unit as a speed m times faster then if the logical record was stored in a single disk device.

Next, a method of creating redundant data according to the division arrangement technique is explained. According to the division arrangement technique, for m physical records resulting from the division of a logical record, n pieces of redundant data are created where $n \geq 1$. The pieces of redundant data are each stored in disk drives as a physical record. Thus, the pieces of redundant data are stored in the disk drives as a total of n physical records. In order to distinguish a physical record of data directly read out or written by an information processing unit from a physical record of redundant data, the former and the latter are referred to hereafter as a data record and a parity record respectively. A group including m data records and n parity records is known as a parity group. In general, if there are n parity records in a parity group, data in the parity group can be recovered when failures occurs in up to n units of disk drives. It should be noted that since a disk drive is normally used for storing a plurality of records, a disk drive contains records pertaining to a plurality of parity groups. Here, (m+n) units of disk drives containing a plurality of parity groups each including (m+n) records is referred to hereafter as a disk parity group. That is to say, a disk parity group is a set of disk drives sharing common redundant data.

According to a second technique of arranging records, one logical record, that is, a read/write unit seen from the processing apparatus side, is stored in a disk drive as a physical record, that is, as one data record. The second technique is referred to hereafter as a non-division arrangement technique. Thus, one logical record is equivalent to one data record. Also in this case, since a physical record can be a data record or a parity record, a physical record is not necessarily equivalent to a logical record. That is to say, a logical record is stored as a physical record but a physical record is not always a logical record. Because a physical record may be a parity record. The non-division arrangement technique offers a feature that read/write processing can be individually carried out on each of the disk drives constituting a disk array.

When the division arrangement technique is adopted, on the other hand, it is necessary to occupy a plurality of disk drives to expedite one read/write processing. As a result, by adopting the non-division arrangement technique, the enhancement of the concurrence of the read/write processing that can be executed in a disk array can be realized. Also in the case of the non-division arrangement technique, n parity records are created from m data records and stored in disk drives. In the case of the division arrangement technique, however, a set of data records pertaining to a parity group appears to an information processing unit as a logical record. Meanwhile, in the case of the non-division arrangement technique, on the other hand, each data record appears to an information processing unit as a completely independent logical record.

U.S. Pat. No. 4,914,656 (Document 2) disclosed a technology in which a spare disk is provided in a disk array. In a disk array, data can be recovered by using recovered data in the event of a failure occurring in a disk drive. However, a new disk drive is required for storing redundant data. A spare disk is an unused disk drive provided in a disk array in advance. Thus, data recovered by using redundant data in the event of a failure occurring in a disk drive can be stored immediately in a spare disk.

In many computer systems, storage apparatuses other than the disk drive are employed. Examples of such storage apparatuses are a magnetic tape and an optical storage device. Recently, much attention has been given to DVD (Digital Versatile Disk). A feature of these storage apparatuses is that, in either case, a storage medium thereof is a separated component from a R/W (Read/Write) unit. Data is read or written from or to a storage medium which is mounted on the R/W unit. In general, such a storage medium is known as a portable medium. In order to implement the control of a very large number of portable storage media with ease in a large-scale computer system, the concept of a library is introduced. A library usually includes not only a large number of storage media and a R/W unit, but also equipment such as a robot for transporting a storage medium back and forth between the R/W unit and a medium accommodating rack for accommodating the storage media.

Since the amount of data handled in a computer system is becoming larger and larger with time, the need for the enhancement of the availability of the data is also extremely high. For this reason, by applying a concept like the one proposed in Document 1 to a storage apparatus system including portable storage media as described above, high data availability can be realized.

Applying such a concept to portable storage media is disclosed, for example, in "DVD Applications," by A. E. Bell of IBM Research Division, Comdex 96, Nov. 20, 1996 (Document 3). Document 3 proposes RAIL (Redundant Arrays of Inexpensive Libraries) having redundancy and including a plurality of ordinary libraries each composed of DVDs, a R/W unit and a robot.

As disclosed in Document 2, in the event of a failure occurring in a disk drive of a disk array, data recovery processing by using redundant data to generate recovered data that is stored in a spare disk is immediately performed. Data recovery processing is immediately conducted using the spare disk to avoid a long period of operation of the disk array using degraded redundancy.

Thereafter, the disk incurring the failure is replaced by a new disk by a person in charge of the storage apparatus system such as a maintenance technician.

In order to make the operation of the disk array simple, it is desirable to have a capability for easily recognizing a set of disk drives pertaining to the same disk parity group, that is, a capability of easily identifying a set of disk drives sharing common redundant data. This is because, if disk drives more than a number indicated by the degree of redundancy are removed by mistake from the set of disk drives pertaining to the same disk parity group, for example, access to data stored in the disk parity group cannot be effectively performed.

In order to avoid the above-described problem, it is necessary to carry out a copy-back operation for restoring the data stored in the spare disk back to a new disk drive used as a replacement for the one incurring the failure. Since the copy-back operation necessitates that the entire data of the disk be transferred, the amount of such data can be very large. Thus, the copy-back operation can be very time consuming. A similar problem is also encountered in a storage apparatus system based on portable storage media as well.

SUMMARY OF THE INVENTION

It is an object of the present invention to provide a technology that, by making the best use of the characteristics of portable storage media, enables the effective execution of processing to switch from a storage medium incurring a failure to a new one.

The present invention makes the best use of the portability of the portable media while implementing the advantages of the redundant arrays. In the present invention spare storage media are prepared in a medium accommodating rack for accommodating storage media in the storage apparatus system. In the event of a failure occurring in a storage medium, a robot employed in the storage apparatus system is used for mounting a spare medium on a R/W unit of the storage apparatus system. Furthermore, some storage media required for recovering data stored in the storage medium incurring a failure is also mounted on the R/W unit. Then, these storage media are used for recovering the data stored in the storage medium incurring a failure and the recovered data is stored in the spare storage medium. After the data recovery processing is completed, the spare storage medium is accommodated at a location in the medium accommodating rack occupied so far by the storage medium incurring a failure before the data recovery processing is started by using the robot.

As a result, a new storage medium can be accommodated at a location in the medium accommodating rack occupied so far by the storage medium incurring a failure without resorting to human intervention and without carrying out heavy-load processing such as a copy-back operation. That is to say, a set of storage media sharing common redundant data can be accommodated at locations closely related to each other in a medium accommodating rack with a high degree of efficiency even after the event of a failure.

BRIEF DESCRIPTION OF THE DRAWINGS

The present invention will be more apparent from the following detailed description, when taken in conjunction with the accompanying drawings, in which.

PREFERRED EMBODIMENTS

The present invention will become more apparent from a study of the following detailed description of some preferred embodiments with reference to accompanying diagrams. First of all, details common to the embodiments are described.

Figure 2:
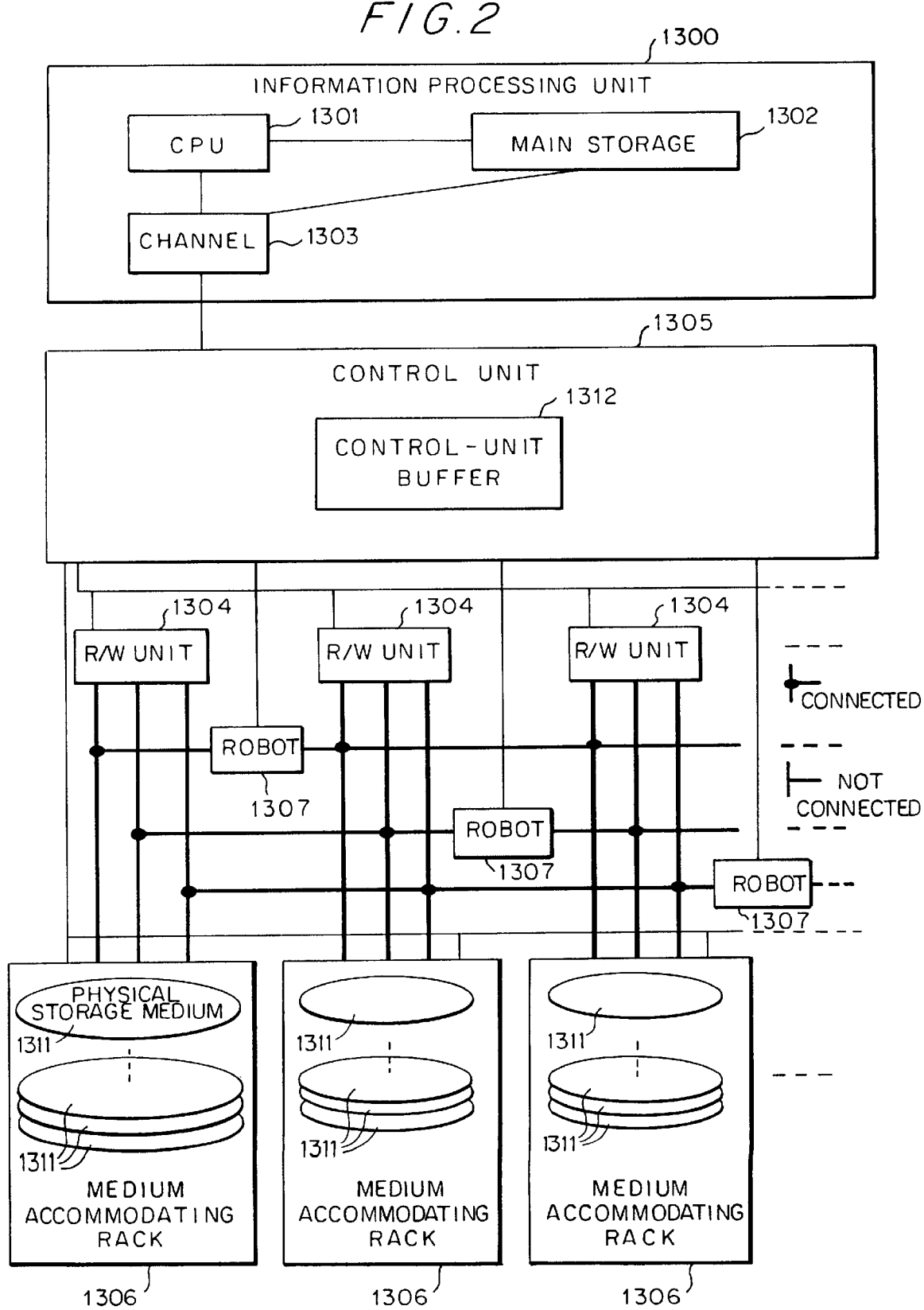
FIG. 2 is a diagram illustrating the configuration of a computer system to which the present invention is applied.

FIG. 2 is a diagram illustrating the configuration of a computer system to which the present invention is applied. As illustrated in FIG. 2, the computer system includes an information processing unit 1300, a control unit 1305, a plurality of R/W units 1304, a plurality of medium accommodating racks 1306 and one or more robots 1307. The information processing unit 1300 typically includes a CPU 1301, a main memory unit 1302 and a channel 1303. The control unit 1305 executes processing to transfer data between the information processing apparatus 1300 and a R/W unit 1304 in accordance with a read/write request issued by the information processing unit 1300. A control-unit buffer 1312 is a buffer for temporarily storing data read out or written by the control unit 1305.

In each of the medium accommodating racks 1306, a plurality of physical storage media 1311 each for storing data are accommodated. Each of the robots 1307 conveys a physical storage medium 1311 between a medium accommodating rack 1306 and a R/W unit 1304. The R/W unit 1304 writes and reads data to and from a physical storage medium 1311 set by the robot 1307.

Figure 3:
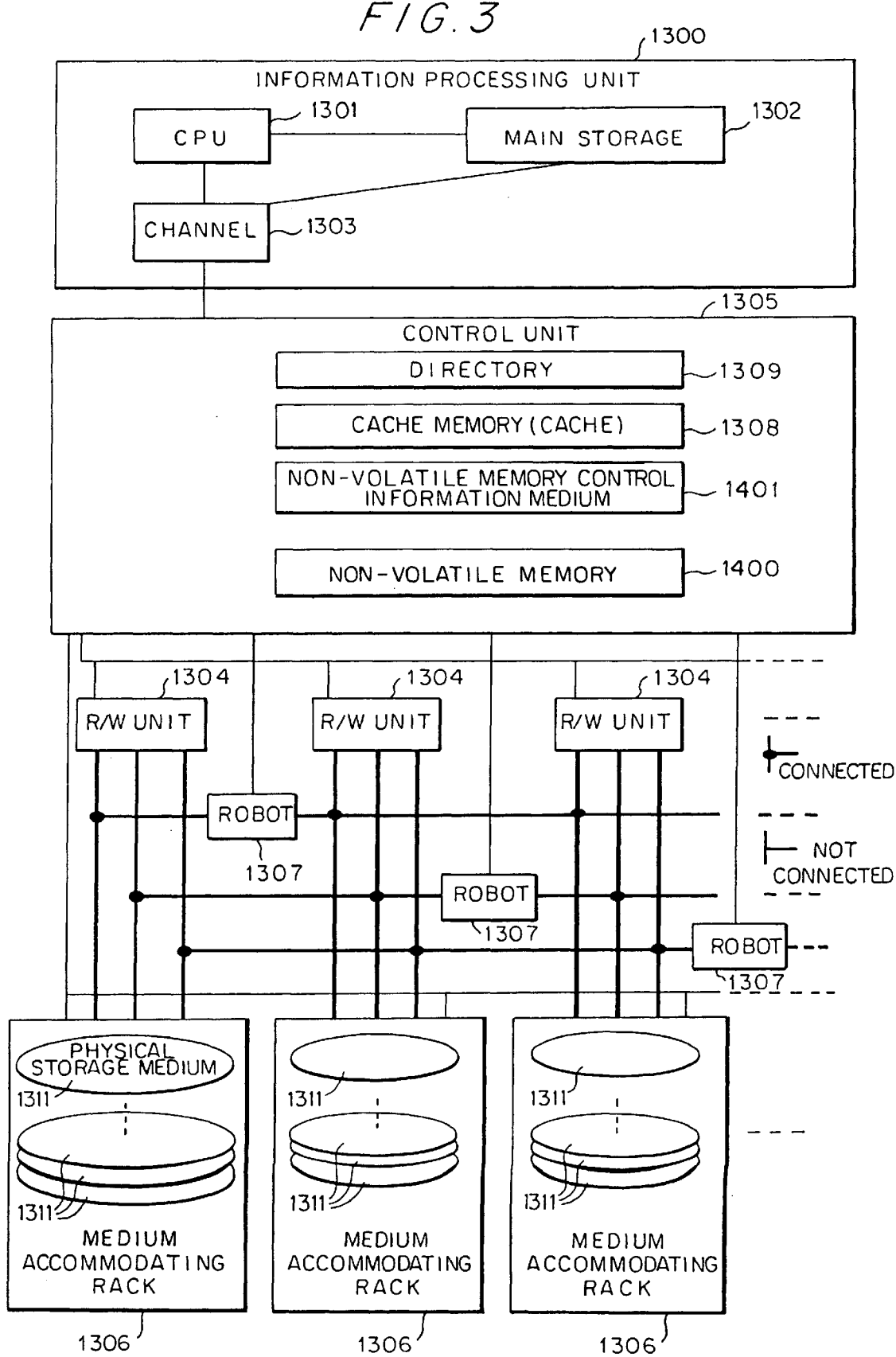
FIG. 3 is a diagram illustrating the configuration of another computer system to which the present invention is applied.
Figure 7:
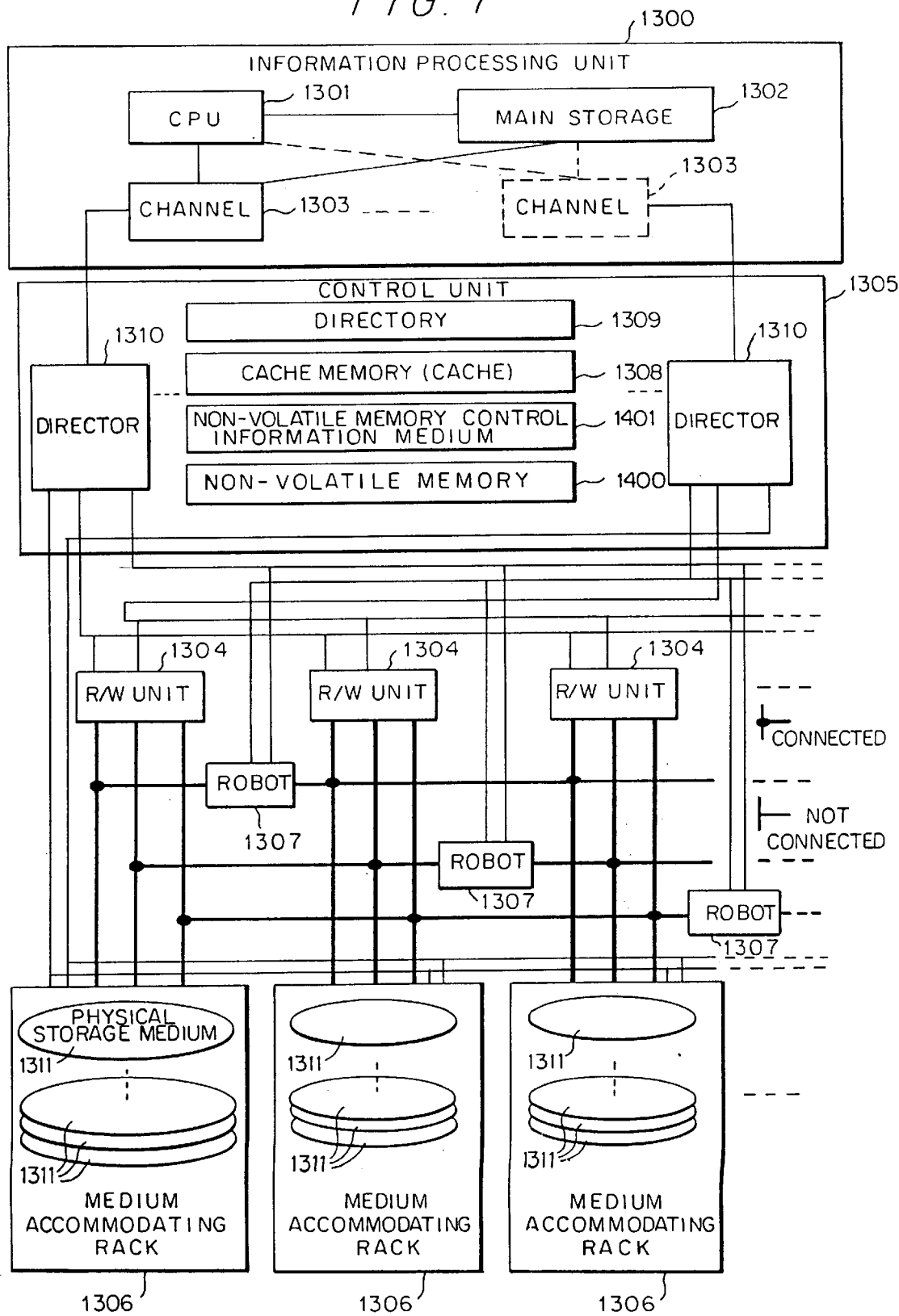
FIG. 7 is a diagram illustrating a configuration wherein a plurality of directors exist.

FIG. 3 is a diagram illustrating the configuration of another computer system to which the present invention is applied. In FIG. 3, the computer system illustrated therein is different from the one illustrated in FIG. 2 in that, in the case of the former, the control unit 1305 includes a cache memory unit 1308, a directory 1309, a non-volatile memory unit 1400 and a non-volatile memory control information medium 1401. The cache memory unit 1308, which is referred to hereafter merely as a cache, is used for storing some of data stored in a physical storage medium 1311 set on the R/W unit 1304. The directory 1309 stores management information of the cache memory 1308. The non-volatile memory 1400 is a non-volatile medium and stores some of data of the physical storage medium 1311 set in the R/W unit 1304 in the same way that the cache memory 1308 does. The non-volatile memory control information medium 1401 is also a non-volatile medium for storing control information of the non-volatile memory unit 1400. The control unit 1305 executes read/write operations between the R/W unit 1304 and the cache 1308 asynchronously with read/write requests issued by the information processing unit 1300. It should be noted that, when the control unit 1305 has two or more directors 1310 as illustrated in FIG. 7, the present invention can be applied to a configuration wherein each of the directors 1310 are used to execute a read/write operation in accordance with a read/write request received from the information processing unit 1300.

A unit of data read or written by the information processing unit 1300 is known as a record. In the present invention, however, a record seen from the information processing unit 1300 in some cases differs from a record actually stored in the physical storage medium 1311. The following is a description of a storage format of data.

Figure 4:
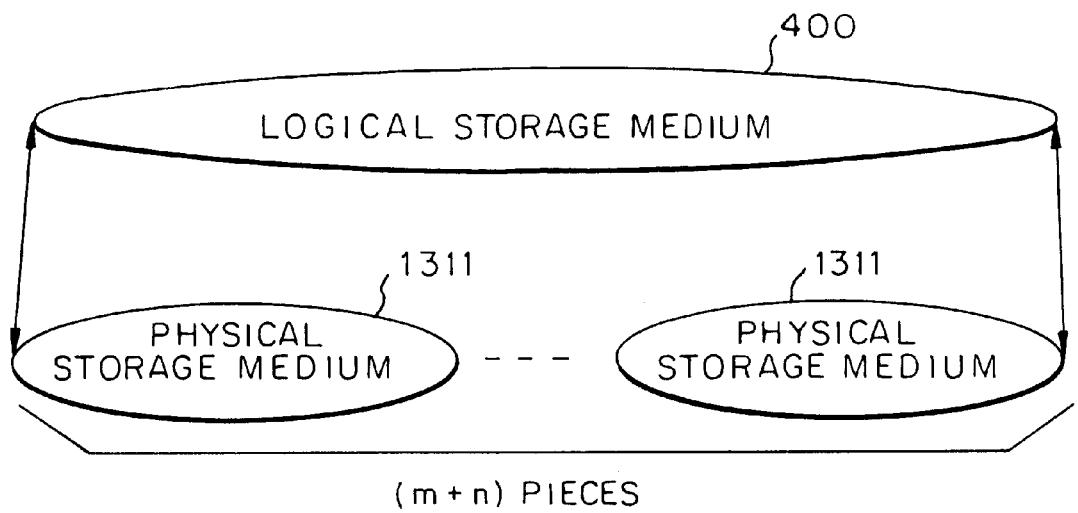
FIG. 4 is a diagram illustrating the configuration of a logical storage medium.
Figure 5:
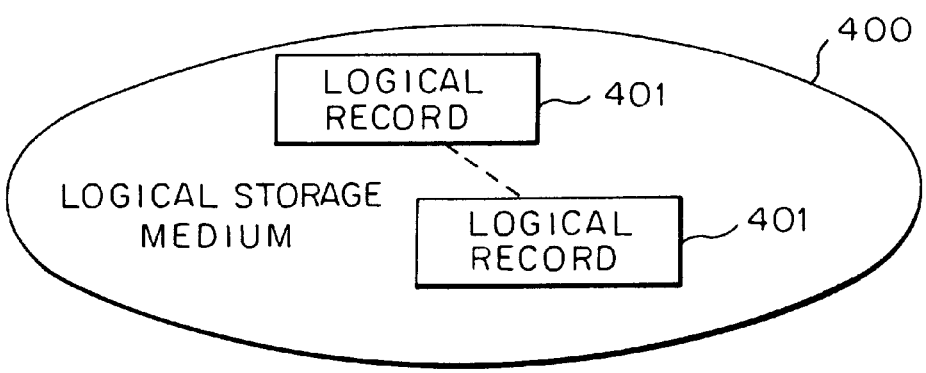
FIG. 5 is a diagram illustrating a relation between a logical record and physical records.

A storage format on the physical storage medium 1311 in the present embodiment is explained by referring to FIGS. 4, 5 and 6 as follows. As illustrated in FIG. 4, a plurality of physical storage media 1311 are seen by the information processing unit 1300 as a single logical storage medium 400. On the other hand, the physical storage medium 1311 is a single physical storage medium which is used as an accommodation unit in the medium accommodating rack 1306, as a transportation unit of the robot 1307 and as a mount/demount unit on the R/W unit 1304. In the configuration illustrated in FIG. 4, (m+n) units of physical storage medium 1311 constitute one logical storage medium 400. A logical record 401 illustrated in FIG. 5 is a record read out or written by the information processing unit 1300. In a configuration illustrated in FIG. 6 a read/write unit actually exchanged between the R/W unit 1304 and the control unit 1305 and actually recorded on the physical storage medium 1311 is referred to as a physical record 1502. In the present invention, a physical record 1502 recorded on the physical storage medium 1311 can be a data record 1500 or a parity record 1501. A data record 1500 is a physical record 1502 containing contents of a logical record 401. A parity record 1501 is a physical record used in processing to recover contents of data records 1500 lost in the event of a failure occurring in a physical storage medium 1311. If the contents of a data record 1500 are changed, it is necessary to also modify the contents of a parity record 1501 associated with the data record 1500.

Figure 6:
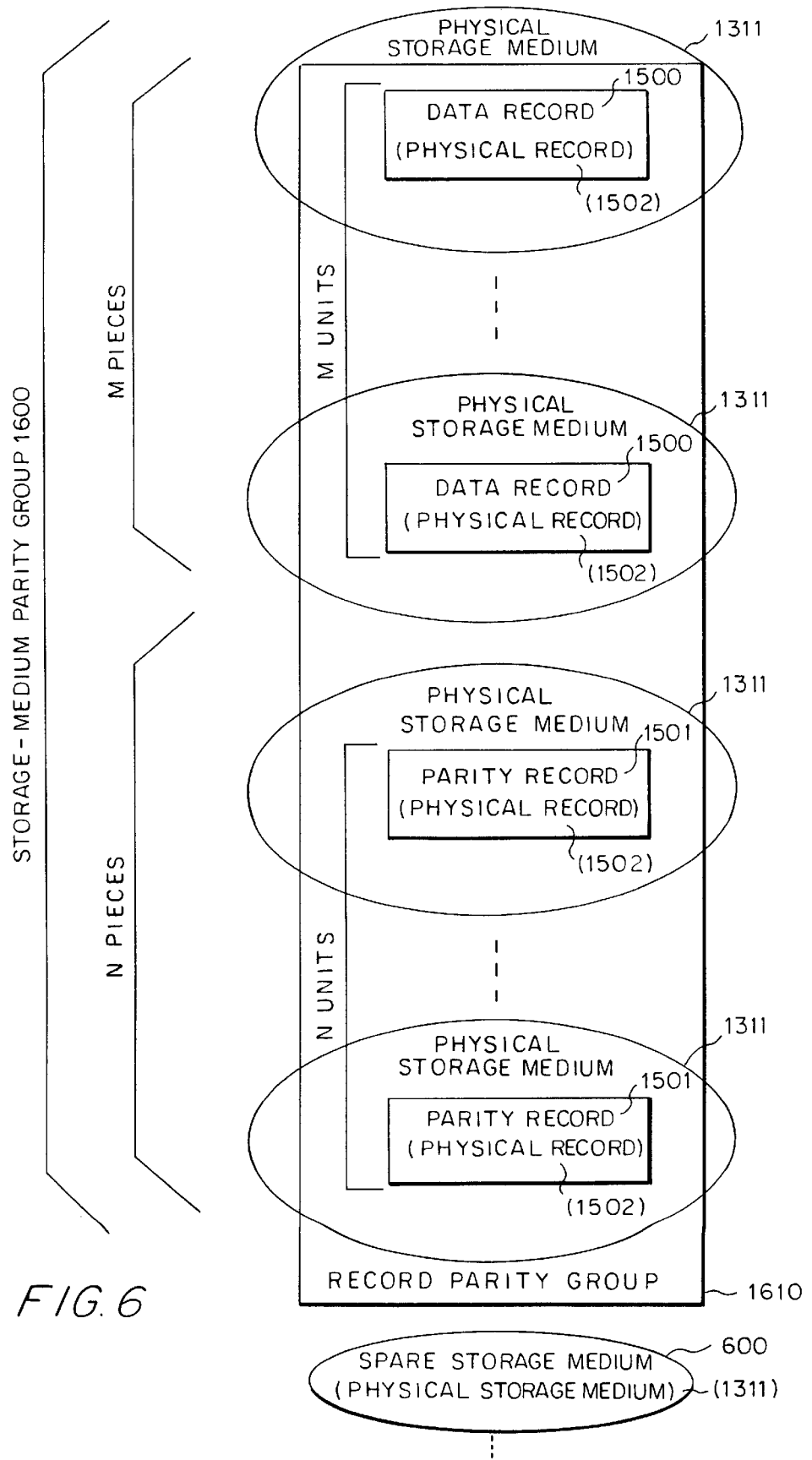
FIG. 6 is a diagram illustrating the configurations of a storage-medium parity group and a record parity group.

Next, a storage-medium parity group 1610, a record parity group 1600 and a spare storage medium 600 used in the present embodiment are explained by referring to FIG. 6. In a configuration illustrated in FIG. 6, the storage-medium parity group 1610 which includes (m+n) units of physical storage medium 1311 appears to the information processing unit 1300 as a single logical medium 400.

The record parity group 1600 is explained as follows. The storage-medium parity group 1610 includes m units of physical storage medium 1311. In each of the physical storage media 1311, a data record 1500 is stored. Thus, there are stored a total of m data records 1500 in the storage-medium parity group 1610. From these m data records 1500, n parity records 1501 are created. Thus, the record parity group 1600 illustrated in FIG. 6 includes m data records 1500 and n parity records 1501. In general, if there are n parity records 1501 in a record parity group 1600, data in all physical records 1502 in the record parity group 1600 can be recovered in the event of failures occurring in up to n units of physical storage medium 1311 among (m+n) units of physical storage medium in which the physical records 1502 of the record parity group 1600 are stored. As a result, high reliability of the physical storage media 1311 can be realized. Thus, in each of the physical storage media 1311, a plurality of physical records 1502 are stored and, in one storage-medium parity group 1610, a plurality of record parity groups 1600 are included.

The spare recording medium 600 used when a failure occurs in a physical storage medium 1311, stores data which was stored in the storage medium 1311 incurring a failure. Under normal conditions, the spare storage medium 600 is a physical storage medium 1311 that does not pertain to the storage-medium parity group 1610. When a failure occurs in a physical storage medium 1311 included in the storage-medium parity group 1610, the spare storage medium 600 takes the place of the storage medium 1311 incurring a failure in the storage-medium parity group 1610. Data stored in the storage medium 1311 incurring a failure can be recovered by using another physical storage medium 1311 pertaining to a storage-medium parity group 1610 including the storage medium 1311 incurring a failure.

Figure 8A:
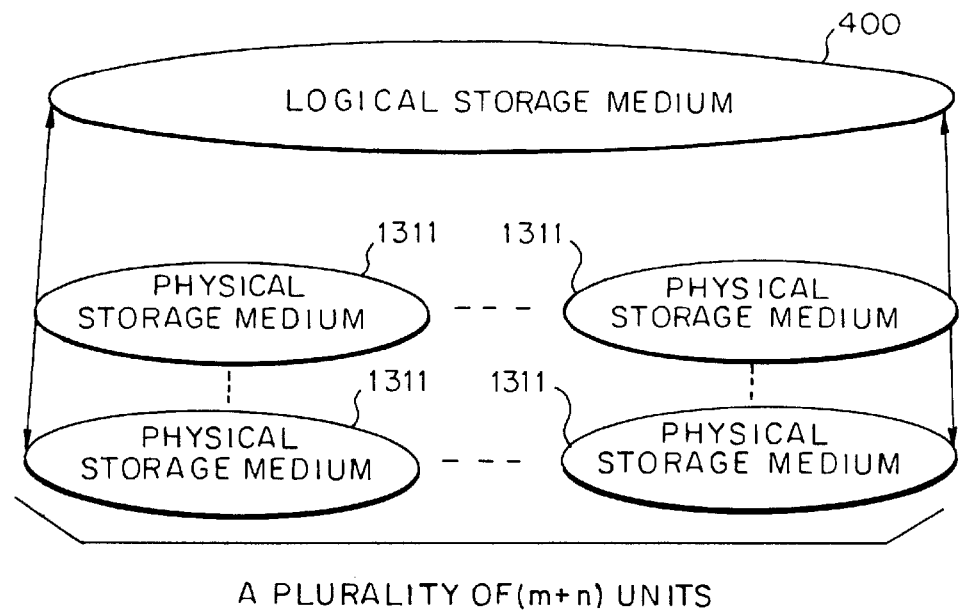
FIGS. 8A–8B are diagrams each illustrating a relation between logical storage media and storage-medium parity groups.
Figure 8B:
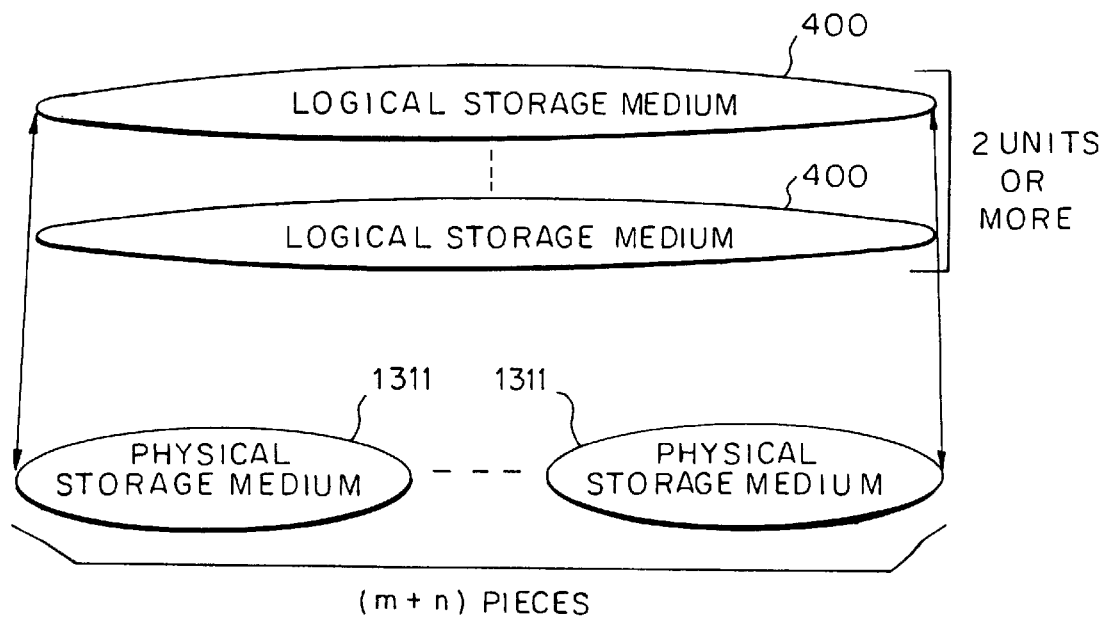

In addition, a recording-medium parity group 1610 may correspond to a plurality of logical storage media 400 as illustrated in FIG. 8B. It should be noted that, in the present invention, one logical storage medium 400 corresponds to a plurality of storage-medium parity groups as illustrated in FIG. 8A.

Figure 9:
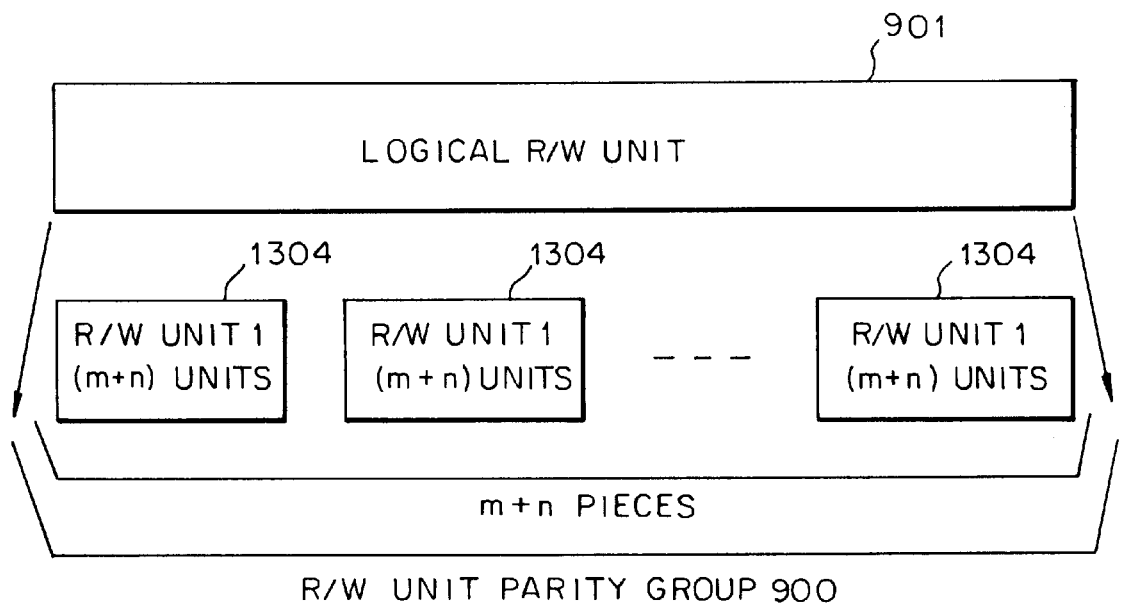
FIG. 9 is a diagram illustrating the configuration of a R/W-unit parity group and a logical R/W unit.

FIG. 9 is a diagram illustrating a R/W-unit parity group 900 and a logical R/W unit 901. As illustrated in FIG. 9, the R/W-unit parity group includes (m+n) R/W units 1304 on which the physical storage media pertaining to the storage-medium parity group 1610 are mounted. In the present embodiment, one or more R/W-unit parity groups 900 are connected to the control unit 1305. The R/W-unit parity group 900 appears to the information processing unit 1300 as a logical R/W unit 901 for executing R/W processing on data stored in the logical storage medium 400 mounted thereon. In the case of a storage-medium parity group 1610 corresponding to a logical storage medium 400 or in the case of a storage-medium parity group 1610 corresponding to a plurality of logical storage media 400 as illustrated in FIG. 8B, a R/W-unit parity group 900 corresponds to a logical R/W unit 901 on a one-to-one basis. In the case of a plurality of storage-medium parity groups 1610 corresponding to a logical storage medium 400 as illustrated in FIG. 8A, a R/W-unit parity group 900 corresponds to a plurality of logical R/W unit units 901.

Figure 10:
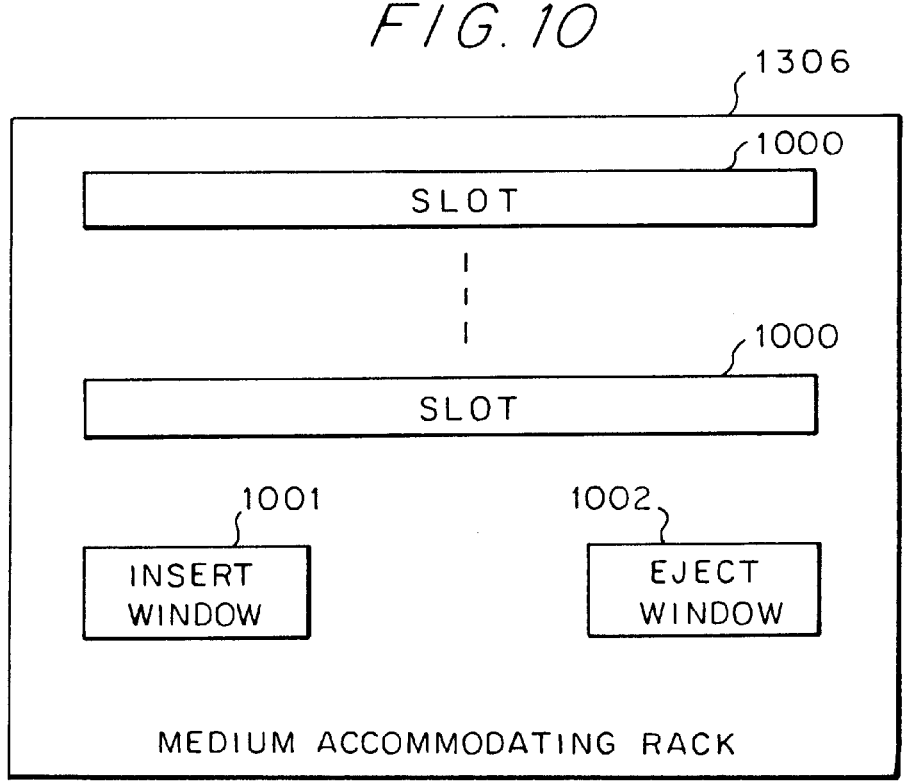
FIG. 10 is a diagram illustrating the configuration of a medium accommodating rack.

FIG. 10 is a diagram illustrating the configuration of the medium accommodating rack 1306. As illustrated in FIG. 10, the medium accommodating rack 1306 is provided with a plurality of slots 1000, an insert window 1001 and an eject window 1002. A slot 1000 is an accommodation unit for accommodating one physical storage medium 1311. The insert window 1001 is an entrance through which a new physical storage medium 1311 is inserted into the medium accommodating rack 1306. The eject window 1002 is an exit for conversely ejecting a physical storage medium 1311 incurring a failure from the medium accommodating rack 1306. The present invention is also applicable to a medium accommodating rack 1306 wherein the insert and eject windows 1001 and 1002 are implemented by a single slot or a medium accommodating rack 1306 with neither an insert window 1001 nor an eject window 1002.

Figure 11A:
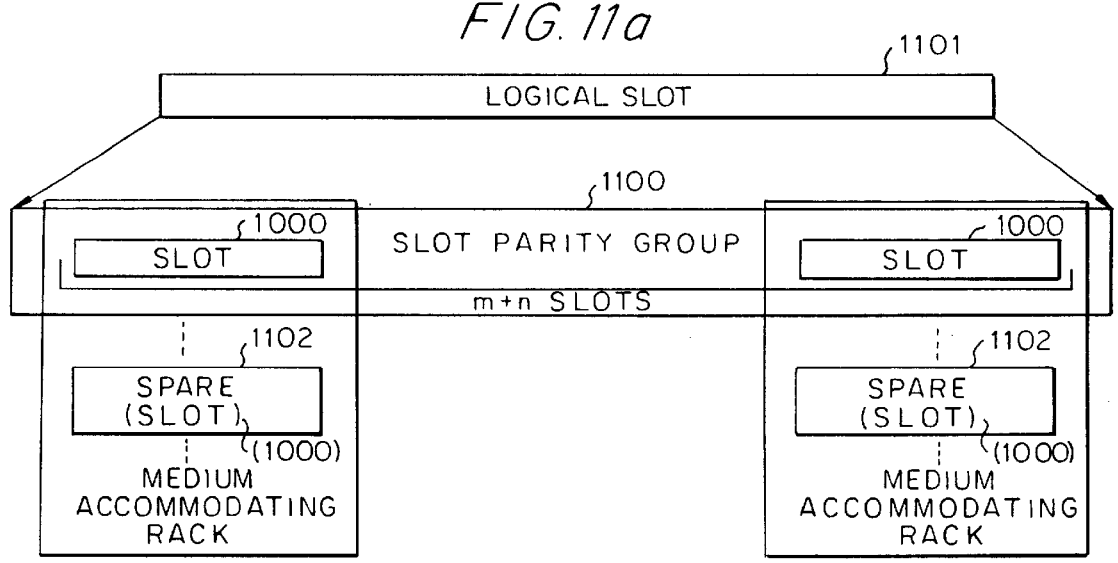
FIGS. 11A–11C are diagrams illustrating the configurations of a slot parity group and a logical slot.
Figure 11B:
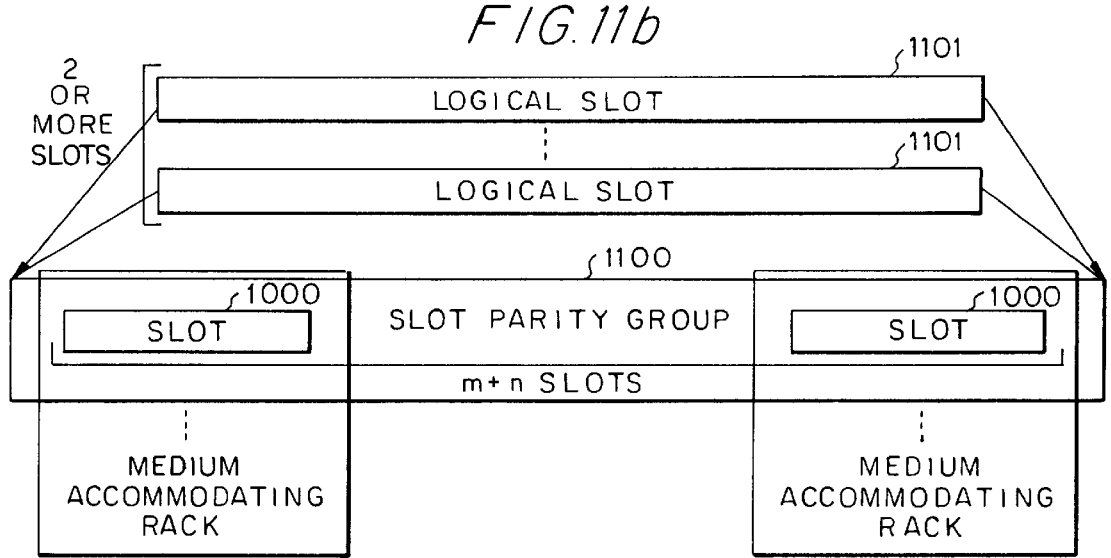
Figure 11C:
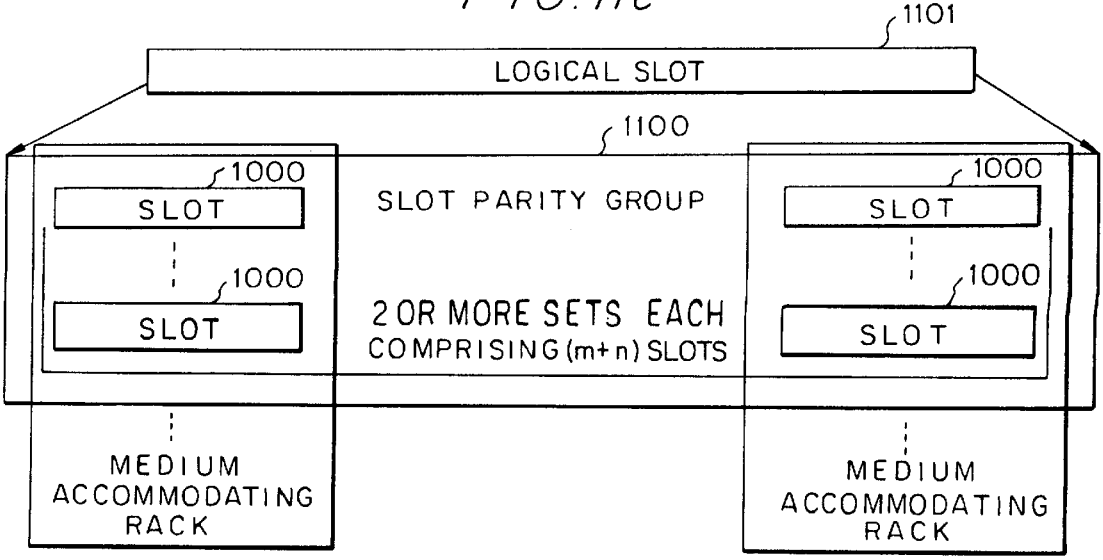

FIGS. 11A–11C are diagrams each illustrating slot parity groups 1100, logical slots 1101 and spare slots 1102. As illustrated in FIGS. 11A–11C, each of the slot parity groups 1100 is a set of (m+n) slots 1000 for accommodating (m+n) units of physical storage medium 1311 pertaining to one storage-medium parity group 1610. In the configuration illustrated in FIGS. 11A–11C, each of slots 1000 pertaining to a slot parity group 1100 are included in a different medium accommodating rack 1305. It should be noted, however, that the present invention is also applicable to a configuration wherein more than one slot in the slot parity group 1100 pertain to one medium accommodating rack 1306 or all slots 1000 included in a slot parity group 1100 pertain to one medium accommodating rack 1306.

A spare slot 1102 is a slot 1000 for accommodating a spare storage medium 1311. As an alternative, the spare slot 1102 may also be empty, accommodating no physical storage medium 1311. As another alternative, the spare slot 1102 may accommodate a physical storage medium 1311 that incurred a failure. In a medium accommodating rack 1306 with no eject window 1102, a physical storage medium 1311 incurring a failure is accommodated in a spare slot 1102.

The logical slot 1101 appears to the information processing unit 1300 as a logical accommodation unit for accommodating a logical storage medium 400. In a storage-medium parity group 1610 corresponding to a logical storage medium 400, a logical slot 1101 is associated with a slot parity group 1100 on a one-to-one basis as illustrated in FIG. 11A. In a storage-medium parity group 1610 corresponding to a plurality of logical storage media 400, a slot parity group 1100 is associated with a plurality of logical slots 1101 as illustrated in FIG. 11B. Furthermore, in a plurality of storage-medium parity groups 1610 corresponding to a logical storage medium 400, a logical slot 1101 is associated with a plurality of slot parity groups 1100 as illustrated in FIG. 11C. It should be noted that, even though the spare slot 1102 is drawn explicitly only in the configuration illustrated in FIG. 11A, the medium accommodating rack 1306 in the configurations illustrated in FIGS. 11B and 11C also include a spare slot 1102. The meaning of a spare slot 1102 in the configurations illustrated in FIGS. 11B and 11C is the same as what has been described before.

In each embodiment described below, a storage-medium parity group 1610 is associated with a logical storage device 400 on a one-to-one basis. The present invention is also applicable to a configuration wherein a storage-medium parity group 1610 is associated with a plurality of logical storage devices 400, and one logical storage device 400 is associated with a plurality of storage-medium parity groups.

Figure 1:
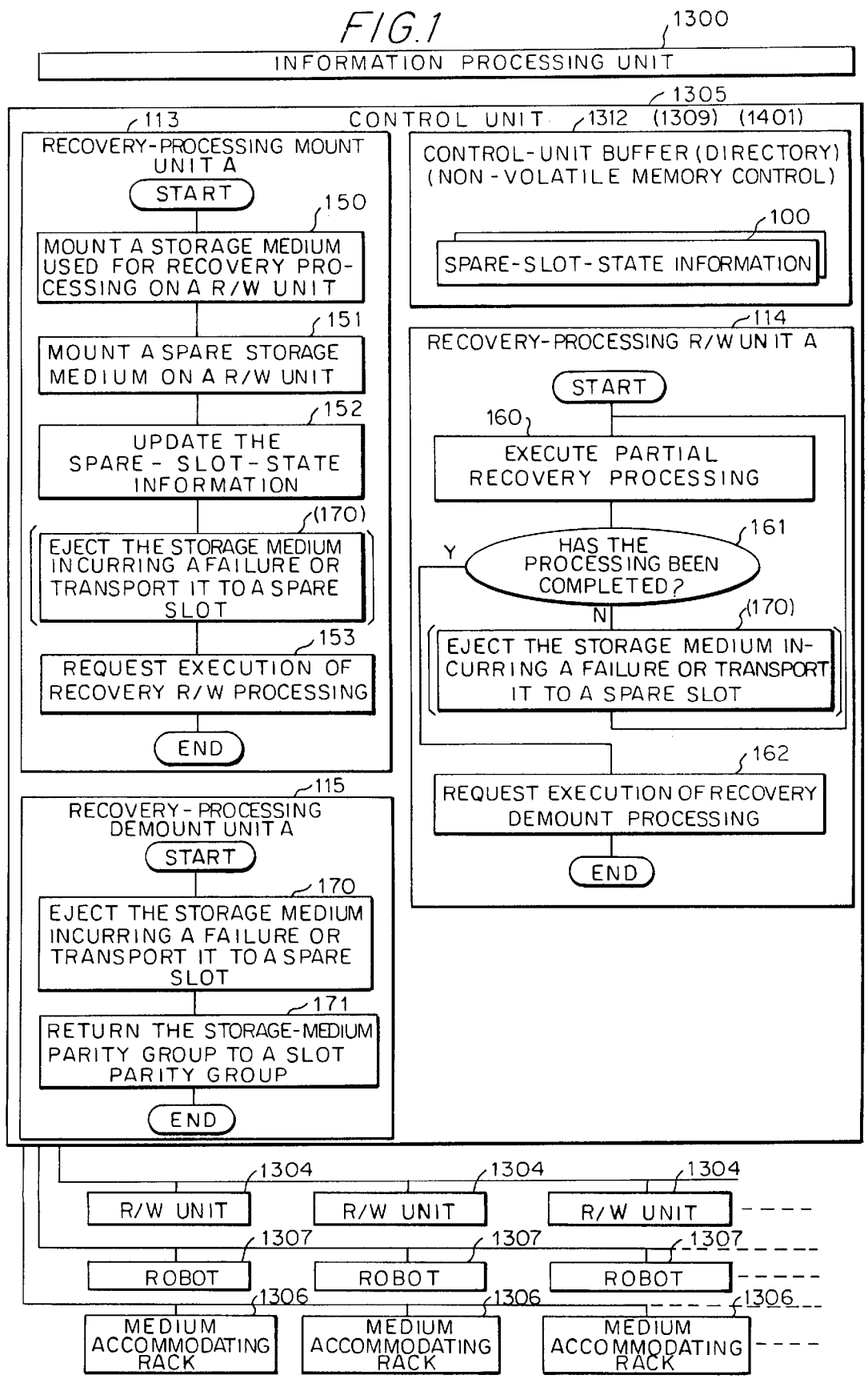
FIG. 1 is a diagram illustrating the configuration and the operation of a first embodiment implementing a storage apparatus system of the present invention.

FIG. 1 is a diagram illustrating the configuration and the operation of a first embodiment implementing a storage apparatus system of the present invention.

As illustrated in FIG. 1, spare-slot-state information 100 is included in components of the control unit 1305 such as the control unit buffer 1312, the directory 1309 and the non-volatile memory control information medium 1401. The spare-slot-state information 100 is information concerning the spare slot 1101. The spare-slot-state information 100 indicates whether a spare storage medium 600 or a physical storage medium 1311 or no physical storage medium 1311 is accommodated in the spare slot 1101 associated with the spare-slot-state information 100.

Major functional units of the control unit 1305 include a recovery-processing mount unit A, a recovery-processing R/W unit A and a recovery-processing demount unit A denoted by reference numerals 113, 114 and 115 respectively. The recovery-processing mount unit A 113 has a function to determine, in the event of a failure occurring in a physical storage medium 1311, execution of processing to recover data stored in the physical storage medium 1311 incurring the failure.

The recovery-processing mount unit A 113 begins with a step 150 at which the control unit 1305 mounts the physical storage media 1311, which pertains to a storage-media parity group 1610 which includes the physical storage medium 1311 incurring a failure, and the physical storage medium not incurring a failure, on the R/W unit 1304 by the robot 1307. The flow of processing then goes on to a step 151 at which the control unit 1305 references the spare-slot-state information 100, and mounts a spare storage medium 600 accommodated in the spare slot 1102 on the R/W unit 1304 by the robot 1307. Then, the flow of processing proceeds to a step 152 at which the control unit 1305 sets the spare-slot-state information 100 associated with the spare slot 1102 to indicate that the spare slot 1102 does not accommodate a physical storage medium 1311. Subsequently, the flow of processing can continue to a step 170. The present invention of course is applicable to the use wherein the processing at a step is executed in the recovery processing demount unit A 115 or in the recovery processing R/W unit A 114. It should be noted that the processing carried out at step 170 is explained in detail in the description of the recovery-processing demount unit A 115. Finally, the flow of processing goes on to a step 153 to make a request for execution of the recovery processing. At the request, the recovery-processing R/W unit A 114 starts the execution of the recovery processing.

In the flow of processing described above, the control unit 1305 transports the spare storage medium 600 from the spare slot 1102 directly to the R/W unit 1304. It is worth noting, however, that the spare storage medium 600 can also be transported to a slot 1000 accommodating a physical storage medium 1311 incurring a failure before being transported to the R/W unit 1304. When the technique described above is adopted the processing of step 170 should be carried out in advance before the execution of the processing to transport the spare storage medium 600 to the slot 1000 accommodating a physical storage medium 1311 incurring a failure. The recovery-processing R/W unit A 114 is a functional unit for executing processing, in the event of a failure occurring in a physical storage medium 1311, to recover data stored in the physical storage medium 1311 that incurred the failure.

The recovery-processing R/W unit A 114 begins with a step 160 at which the control unit 1305 executes recovery processing for a partial area. The flow of processing then goes on to a step 161 at which the control unit 1305 checks whether or not the recovery processing has been completed for all partial areas. If competed, the flow of processing proceeds to a step 162 at which the control 1305 activates the recovery-processing demount unit A 115. If not completed yet, the flow of processing returns to the step 160 to carry out recovery processing for a next partial area. It should be noted, however, that before returning to the step 160, the flow of processing can continue to a step 170. As described earlier, the processing carried out at step 170 is explained in concrete terms in the description of the recovery-processing demount unit A 115.

At the step 162, the control unit 1305 makes a request for execution of the demount processing. At this request, the recovery-processing demount unit A 115 starts executing the demount processing. It is worth noting that the demount processing does not have to be carried out right after the recovery processing. This is because it is within the bounds of possibility that the information processing units 1300 may request use of the storage-medium parity group 1610 while the recovery processing was under way.

The recovery-processing demount unit A 115 is a functional unit for executing processing to restore a physical storage medium 1311 to a slot 1000. As illustrated in FIG. 1 the recovery-processing demount unit A 115 begins with a step 170 at which the control unit 1305 ejects the physical storage medium 1311 incurring a failure from the medium accommodating rack 1306 by the robot 1307 or to mount the physical storage medium 1311 in a spare slot 1102 accommodating no physical storage medium 1311. If the physical storage medium 1311 incurring a failure is mounted in the spare slot 1102, the spare-slot-state information 100 associated with the spare slot 1102 is set to indicate that the spare slot 1102 accommodates the physical storage medium 1311 incurring a failure. It should be noted that the processing of the step 170 can also be carried out in the recovery-processing mount unit A 113 or the recovery-processing R/W unit A 114 as described earlier.

At least, after the recovery processing has been completed, a physical storage medium 1311, which was a spare medium 600, is newly incorporated in the storage-medium parity group 1610 in place of the physical storage medium 1311 incurring a failure. The new physical storage medium 1311 is a medium that is now used for storing data stored so far in the physical storage medium 1311 incurring a failure. The flow of processing then goes on to a step 171 at which the control unit 1305 returns the storage-medium parity group 1610 newly incorporating the physical storage medium 1311 to the slot parity group 1100 by means of the robot 1307. In this case, it is not necessary to return the storage-medium parity group 1610 to a slot parity group 1100 which included the storage-medium parity group 1610.

It is worth noting that a set of slots 1000 pertaining to a slot parity group physically exists at locations in a medium accommodating rack 1306 which can be easily identified. As a result, at least, the new physical storage medium 1311 incorporated in the storage-medium parity group 1610 is not returned to a spare slot 1102 that accommodated the new physical storage medium 1311 at the time a decision was made to use the new physical storage medium 1311.

Figure 12:
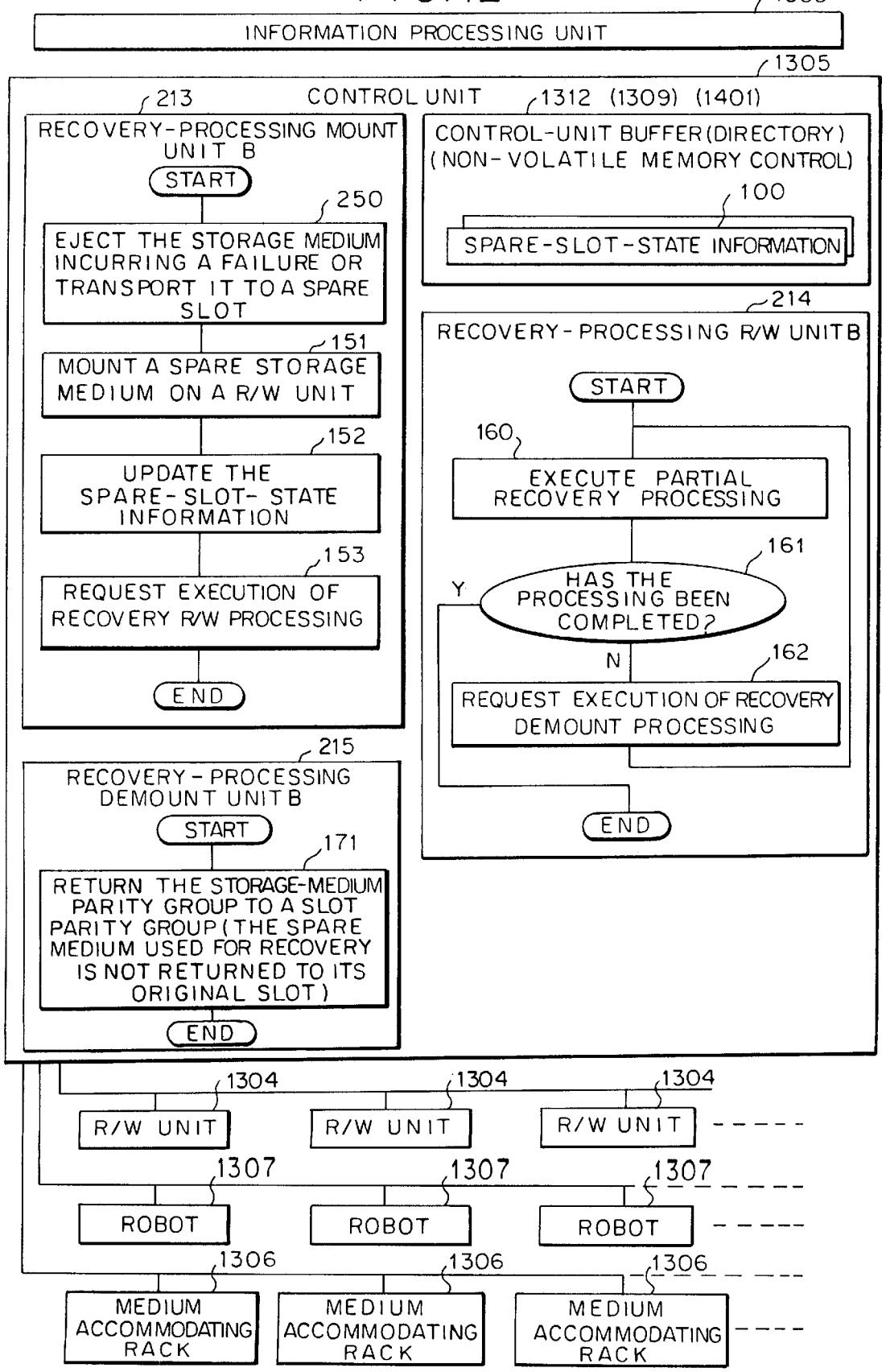
FIG. 12 is a diagram illustrating the configuration and the operation of a second embodiment implementing a storage apparatus system of the present invention.

FIG. 12 is a diagram illustrating the configuration and the operation of a second embodiment implementing a storage apparatus system. In the second embodiment, processing to recover a recording-medium parity group 1610 mounted on a R/W-unit parity group 900 is carried out. In many cases, a failure occurring in a physical storage medium 1311 is actually detected in the course of R/W processing. It is thus within the bounds of possibility that recovery processing is carried out on a recording-medium parity group 1610 mounted on a R/W-unit parity group 900. Thus, in the case of the second embodiment, a physical storage medium 1311 to be newly mounted on the R/W unit 1304 is nothing but the spare storage medium 600.

As is the case with the first embodiment, spare-slot-state information 100 is included in components of the control unit 1305 such as the control unit buffer 1310, the directory 1309 and the non-volatile memory control information medium 1401 as information on the second embodiment. Major functional units of the control unit 1305 include a recovery-processing mount unit B, a recovery-processing R/W unit B and a recovery-processing demount unit B denoted by reference numerals 213, 214 and 215 respectively. The recovery-processing mount unit B 213, the recovery-processing R/W unit B 214 and the recovery-processing demount unit B 215 correspond to the recovery-processing mount unit A 113, the recovery- processing R/W unit A 114 and the recovery-processing demount unit A 115 respectively of the first embodiment. Differences between the first and second embodiments are explained as follows.

First of all, a processing flow of the recovery-processing mount unit B 213 is explained. As illustrated in FIG. 12, the processing begins with a step 250 at which the control unit 1305 ejects a physical storage medium 1311 incurring a failure from the medium accommodating rack 1306 by a robot 1307, or demounts the physical storage medium 1311 incurring a failure on a spare slot 1102 accommodating no physical storage medium 1311 by referencing the spare-slot-state information 100. When the physical storage medium 1311 incurring a failure is demounted in the spare slot 1102, the spare-slot-state information 100 associated with the spare slot 1102 is set to indicate a state of the spare slot 1102 accommodating the physical storage medium 1311 incurring a failure. Since other processings, namely the processings from step 151 to 153 are included in the recovery-processing mount unit A 213, their explanation is omitted.

In the processing flow described above, the control unit 1305 transports a spare recording medium 600 from the spare slot 1102 directly to the R/W unit 1304. It should be noted that, also in the case of the second embodiment, the spare storage medium 600 can be transported to a slot 1000 accommodating a physical storage medium 1311 incurring a failure before being transported to the R/W unit 1304 as is the case with the first embodiment.

The recovery-processing R/W unit B 214 and the recovery-processing demount unit B 215 are the same as the recovery-processing R/W unit A 114 and the recovery-processing demount unit A 115 respectively except that the former does not include the processing carried out at step 170. Step 170 is a processing carried out by the control unit 1305 to handle the physical storage medium 1311 incurring a failure. Since the remaining processings are the same, their explanation is omitted.

In order to make maintenance work of a storage apparatus system having redundant data easy, it is desirable to set a storage-medium group sharing common redundant data at locations which can be easily identified. According to the present invention, in a storage apparatus system based on transportable recording media, a new storage medium is moved to a location that is closely related to a recording media pertaining to a storage-medium group sharing common redundant data with the new storage medium by a robot. As a result, even if a storage medium is replaced by a new one in the event of a failure occurring in a storage medium, the storage medium group sharing the common redundant data can be located at a place that can be easily identified.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. A storage apparatus system comprising:
   at least one storage medium group comprising (m+n) storage media where m and n are integers and m≧1 and n≧1, each of said storage media being used for storing at least one record group including m data records and n redundant records, wherein each data record contains data accessed by an information processing unit and each redundant record contains redundant data for recovering data contained in said data records;
   at least one spare storage media being used, upon occurrence of a failure in any of said storage media of said storage medium group, for storing data stored in a storage media incurring a failure;
   at least one medium accommodating rack comprising a plurality of accommodation units each accommodating one of said storage media of said storage medium group or one of said spare storage media;
   at least (m+n) read/write units for mounting said storage media and carrying out read/write operations on said mounted storage media;
   at least one robot for transporting said storage media between said medium accommodating rack and said read/write units;
   a control unit for controlling said medium accommodating rack, said read/write units and said robot in accordance with a request made by said information processing unit;
   spare storage media selecting means being used, upon occurrence of a failure in any of said storage media of said storage medium group, for selecting one of said spare storage media for storing data stored in said storage media incurring a failure and for mounting said selected spare storage media on one of said read/write units by use of said robot;
   recovery means for storing said data stored in said storage media incurring a failure in said selected spare storage media; and
   means for restoring, by use of said robot, said selected spare storage media to an accommodation unit different from an accommodation unit originally occupied by said selected spare media upon completion of said storing operation carried out by said recovery means.

2. A storage apparatus system according to claim 1, wherein each of said storage media is a transportable recording media.

3. A storage apparatus system according to claim 2, wherein said transportable recording media is a Digital Versatile Disk (DVD).

4. A storage apparatus system according to claim 1, wherein said spare storage media selecting means selects one of said spare storage media based on spare slot state information.

5. A storage apparatus system according to claim 4, wherein said spare slot state information indicates whether spare storage media is accommodated in an accommodation unit of said medium accommodating rack.

6. A storage apparatus system according to claim 5, wherein said spare storage media selecting means updates the spare slot state information when one of said spare storage media is selected.

7. A storage apparatus system according to claim 1, further comprising:
   means for transporting said storage media incurring a failure to said accommodation unit which was originally occupied by said selected spare storage media.

8. A storage apparatus system according to claim 7, wherein said accommodation unit to which said selected spare storage media is restored is an accommodating unit originally occupied by said storage media incurring a failure.

9. A storage apparatus system according to claim 1, further comprising:
   means for ejecting said storage media incurring a failure.

10. A storage apparatus system according to claim 1, wherein said accommodation unit to which said selected spare storage media is restored is an accommodating unit originally occupied by said storage media incurring a failure.

11. A controller for controlling a storage apparatus system which includes at least one storage medium group comprising a plurality of storage media for storing data records and redundant records, wherein each data record contains data accessed by an information processing unit and each redundant record contains redundant data for recovering data contained in said data records, at least one spare storage media for storing data stored in a storage media incurring a failure and at least one medium accommodating rack comprising a plurality of accommodation units each accommodating one of said storage media or one of said spare storage media, said controller comprising:
   spare storage media selecting means for, upon occurrence of a failure in any of said storage media of said storage medium group, selecting one of said spare storage media for storing data stored in said storage media incurring a failure;
   recovery means for storing said data stored in said storage media incurring a failure in said selected spare storage media; and
   means for restoring said selected spare storage media to an accommodation unit different from an accommodation unit originally occupied by said selected spare media upon completion of said storing operation carried out by said recovery means.

12. A controller according to claim 11, wherein each of said storage media is a transportable recording media.

13. A controller according to claim 12, wherein said transportable recording media is a Digital Versatile Disk (DVD).

14. A controller according to claim 11, wherein said spare storage media selecting means selects one of said spare storage media based on spare slot state information.

15. A controller according to claim 14, wherein said spare slot state information indicates whether spare storage media is accommodated in an accommodation unit of said medium accommodating rack.

16. A controller according to claim 15, wherein said spare storage media selecting means updates the spare slot state information when one of said spare storage media is selected.

17. A controller according to claim 11, further comprising:
   means for transporting said storage media incurring a failure to said accommodation unit which was originally occupied by said selected spare storage media.

18. A controller according to claim 17, wherein said accommodation unit to which said selected spare storage media is restored is an accommodating unit originally occupied by said storage media incurring a failure.

19. A controller according to claim 11, further comprising:
   means for ejecting said storage media incurring a failure.

20. A controller according to claim 11, wherein said accommodation unit to which said selected spare storage media is restored is an accommodating unit originally occupied by said storage media incurring a failure.

21. A method of controlling a storage apparatus system which includes at least one storage medium group comprising a plurality of storage media for storing data records and redundant records, wherein each data record contains data accessed by an information processing unit and each redundant record contains redundant data for recovering data contained in said data records, at least one spare storage media for storing data stored in a storage media incurring a failure and at least one medium accommodating rack comprising a plurality of accommodation units each accommodating one of said storage media or one of said spare storage media, said method comprising the steps of:

selecting, upon occurrence of a failure in any of said storage media of said storage medium group, one of said spare storage media for storing data stored in said storage media incurring a failure;

storing said data stored in said storage media incurring a failure in said selected spare storage media; and restoring said selected spare storage media to an accommodation unit different from an accommodation unit originally occupied by said selected spare media upon completion of said storing step.

22. A method according to claim 21, wherein each of said storage media is a transportable recording media.

23. A method according to claim 22, wherein said transportable recording media is a Digital Versatile Disk (DVD).

24. A method according to claim 21, wherein said selecting step comprises the step of:

selecting one of said spare storage media based on spare slot state information.

25. A method according to claim 24, wherein said spare slot state information indicates whether spare storage media is accommodated in an accommodation unit of said medium accommodating rack.

26. A method according to claim 25, wherein said spare storage media selecting means updates the spare slot state information when one of said spare storage media is selected.

27. A method according to claim 21, further comprising the step of:

transporting said storage media incurring a failure to said accommodation unit which was originally occupied by said selected spare storage media.

28. A method according to claim 27, wherein said accommodation unit to which said selected spare storage media is restored is an accommodating unit originally occupied by said storage media incurring a failure.

29. A method according to claim 21, further comprising the step of:

ejecting said storage media incurring a failure.

30. A method according to claim 21, wherein said accommodation unit to which said selected spare storage media is restored is an accommodating unit originally occupied by said storage media incurring a failure.

* * * * *